US006498965B2

(12) United States Patent
Matsumoto et al.

(10) Patent No.: US 6,498,965 B2
(45) Date of Patent: Dec. 24, 2002

(54) SYSTEM FOR CONTROLLING VENDING MACHINE

(75) Inventors: Naoto Matsumoto, Maebashi (JP); Kazuyasu Ushigome, Isesaki (JP); Tomonobu Sato, Isesaki (JP); Masaru Ohkubo, Isesaki (JP)

(73) Assignee: Sanden Corp. (JP)

( * ) Notice: Subject to any disclaimer, the term of this patent is extended or adjusted under 35 U.S.C. 154(b) by 50 days.

(21) Appl. No.: 09/850,155

(22) Filed: May 8, 2001

(65) Prior Publication Data

US 2001/0044675 A1 Nov. 22, 2001

(30) Foreign Application Priority Data

May 9, 2000 (JP) ...................................... 2000-136230

(51) Int. Cl.[7] .......................... G05B 19/18; G06F 17/00

(52) U.S. Cl. ........................................... 700/231; 700/3

(58) Field of Search ................................ 700/231, 232, 700/233, 3, 9, 19, 20, 23; 194/217; 221/129

(56) References Cited

U.S. PATENT DOCUMENTS 4,872,541 A * 10/1989 Hayashi ...................... 221/129
5,793,629 A * 8/1998 Ishida et al. ................ 700/232
5,980,078 A * 11/1999 Krivoshein et al. ............ 700/9
6,339,726 B1 * 1/2002 Miyata et al. .............. 700/231

OTHER PUBLICATIONS

Patent Abstracts of Japan, Japanese Publication No. 05–054253, published Mar. 5, 1993.

Patent Abstracts of Japan, Japanese Publication No. 05–089325, published Apr. 9, 1993.

Patent Abstracts of Japan, Japanese Publication No. 10–198845, published Jul. 31, 1998.

* cited by examiner

*Primary Examiner*—Christopher P. Ellis
*Assistant Examiner*—Gene O. Crawford
(74) *Attorney, Agent, or Firm*—Banner & Witcoff, Ltd.

(57) ABSTRACT

A rewriting program is transferred from a main control apparatus to a terminal control apparatus and the terminal control apparatus executes the rewriting program. The rewriting program receives a new control program from the main control apparatus and rewrites a control program with a received new control program. This makes it possible to easily and reliably rewrite the control program even if a specification of the control program is changed.

8 Claims, 12 Drawing Sheets

SYSTEM FOR CONTROLLING VENDING MACHINE

BACKGROUND OF THE INVENTION

One of conventionally known control systems for this type of a vending machine is a system, which includes controlled apparatuses each equipped with a terminal control apparatus, and a main control apparatus connected to the terminal control apparatuses via a communication line. The controlled apparatus here refers to a device controlled by the main control apparatus and includes, for example, a display apparatus to display the sum of money deposited, a product carrying-out apparatus to control carrying-out of products and a coin identification apparatus to identify the authenticity and type of coins deposited, etc.

In this control system, the main control apparatus supervises and controls all terminal control apparatuses. On the other hand, each terminal control apparatus individually controls its controlled apparatus based on the contents of communication with the main control apparatus. Each terminal control apparatus is equipped with a calculation apparatus, a storage apparatus, a controlled apparatus and an input/output apparatus, etc. and operates based on a control program stored in the storage apparatus.

By the way, this type of control system sometimes needs to renew the control program stored in the storage apparatus of the terminal control apparatus due to changes to the specification. In such a case, the storage apparatus is conventionally replaced with a new one. More specifically, this replacement work consists of removing a ROM, the storage apparatus, and mounting a new ROM storing a new control program.

However, such replacement work not only takes time and trouble but also is likely to involve trouble that the ROM pins are folded and damaged. Especially, the terminal control apparatuses are provided together with the controlled apparatuses and these controlled apparatuses are distributed in different places of the vending machine according to their respective functions. For this reason, replacing the storage apparatus of a terminal control apparatus installed in a place with poor workability takes considerable time and trouble. Furthermore, when storage apparatuses corresponding to a plurality of terminal apparatuses are replaced at a time, those storage apparatuses need to be replaced one by one. This not only takes considerable time and trouble but also involves a possibility that storage apparatuses may be mistaken for other apparatuses.

Such being the case, a control system is proposed which uses an electrically rewritable EEPROM as a storage apparatus of the terminal control apparatus. In this control system, each terminal control apparatus is provided with a connecting apparatus capable of connecting a detachable portable memory card and each terminal control apparatus is provided with a rewriting program. Then, a memory card in which a new control program is pre-stored is inserted into the connecting apparatus and the rewriting program is executed, and in this way the control program stored in the storage apparatus is replaced with a new one stored in the memory card. This method can update the control program relatively easily without requiring any troublesome operation like replacement of ROM. However, this control system still cannot solve the last problem described above.

BRIEF SUMMARY OF THE INVENTION

It is an object of the present invention to provide a vending machine control system capable of easily and reliably rewriting a control program of each terminal control apparatus.

To attain this object, the present invention provides a control system for vending machine comprises a terminal control apparatus that controls controlled apparatuses of the vending machine and a main control apparatus that is connected with the terminal control apparatus via a transmission path and controls the terminal control apparatus through communication with the terminal control apparatus, wherein the main control apparatus includes transferring means for transferring a control program for the terminal control apparatus and a rewriting program to rewrite the control program to the terminal control apparatus via a transmission path, and the terminal control apparatus includes first storing means for storing the control program for the controlled apparatuses, second storing means for storing the rewriting program and rewriting program receiving and executing means for storing the rewriting program received from the main control apparatus in the second storing means and executing the rewriting program, the rewriting program executed by the rewriting program receiving and executing means receives the control program from the main control apparatus and rewrites the control program stored in the first storing means with the control program received from the main control apparatus.

According to the present invention, when a control program of the terminal control apparatus is rewritten, once the rewriting program is transferred from the main control apparatus to the terminal control apparatus, the rewriting program is executed by the rewriting program receiving/executing means of the terminal control apparatus. Then, a new control program is transferred from the main control apparatus according to the rewriting program and the control program stored in the first storing means is rewritten to the new control program. Thus, it is possible to easily and reliably update the control program without being influenced by the installation location of the terminal control apparatus. Moreover, since the rewriting program is transferred from the main control apparatus, the control program can be rewritten reliably even if the specification, etc. of the control program is modified.

The objects, configurations and effects other than those described above will become more apparent from the following detailed explanations.

DETAILED DESCRIPTION OF THE INVENTION

[First Embodiment]

Figure 1:
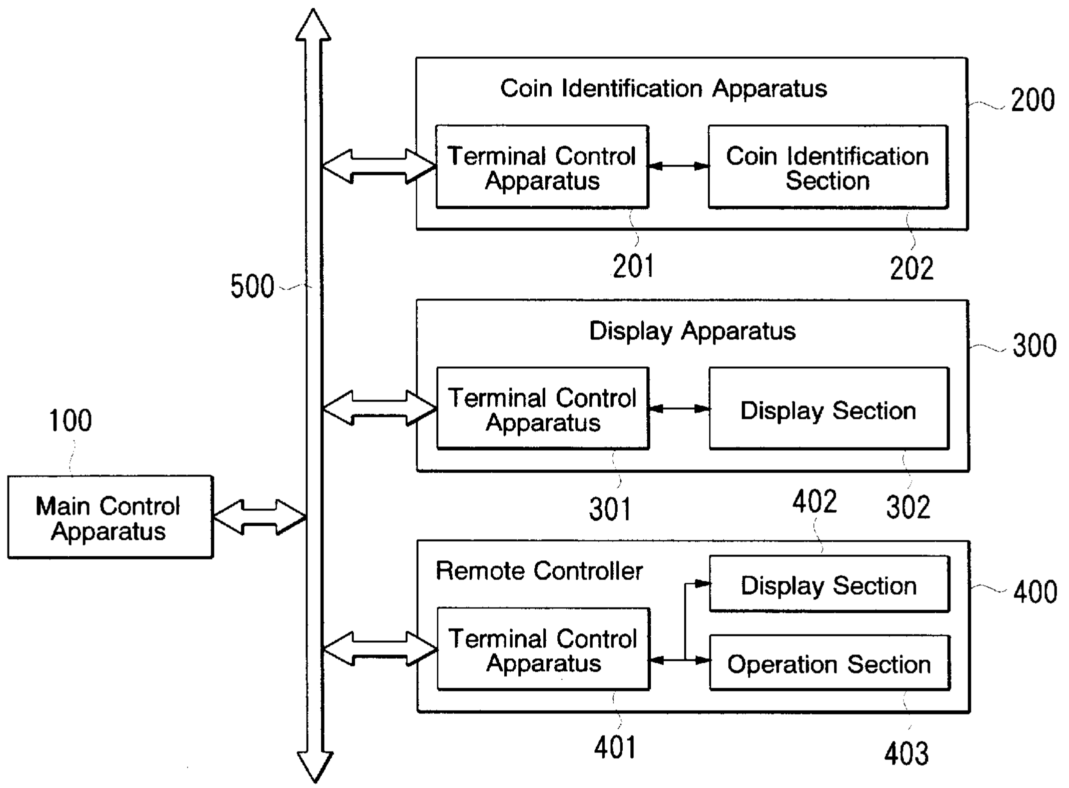
FIG. 1 is a schematic diagram of a control system for a vending machine according to a first embodiment.
Figure 2:
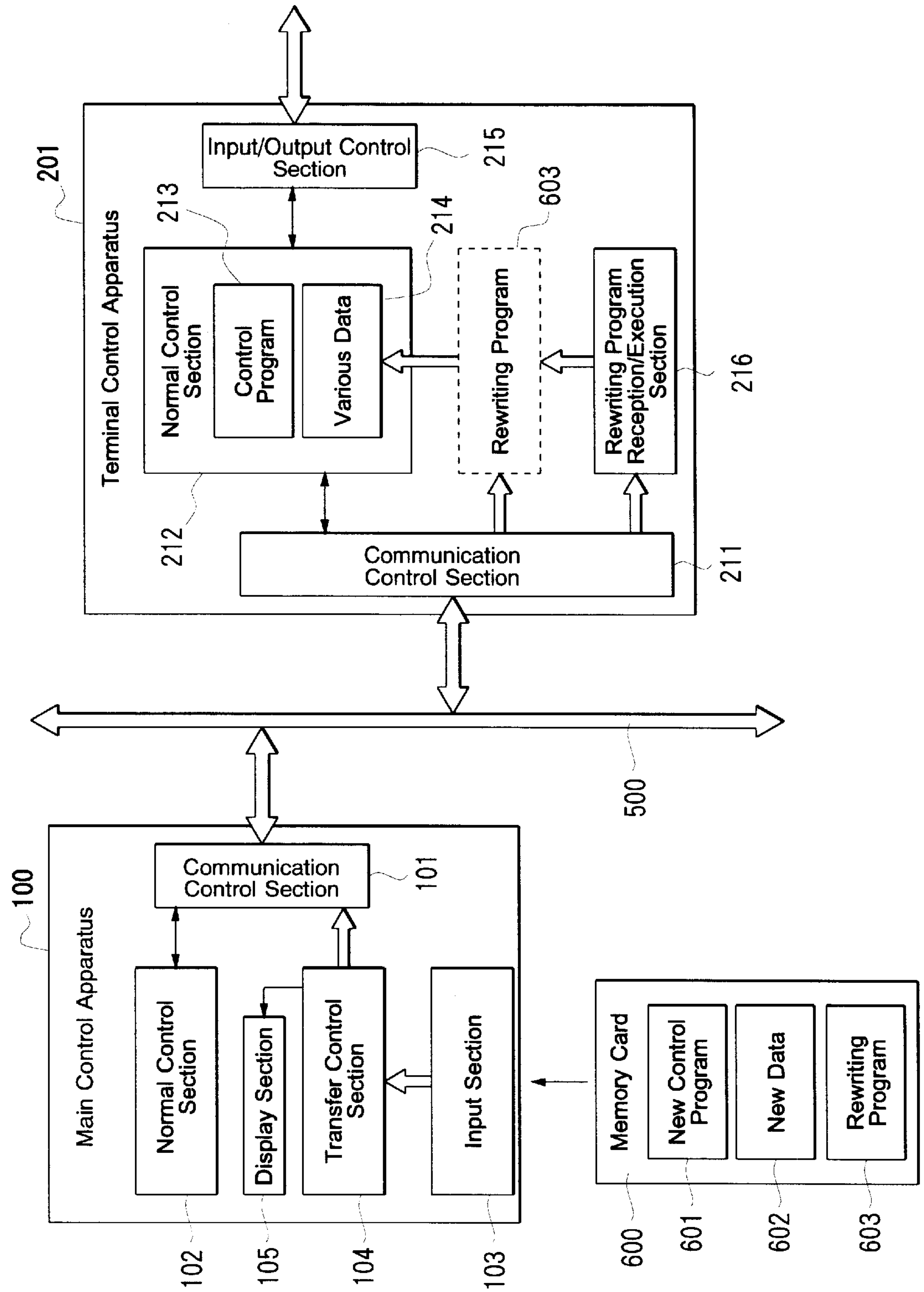
FIG. 2 is a functional block diagram of the control system for the vending machine according to the first embodiment.

With reference now to the attached drawings, a control system for a vending machine according to a first embodiment of the present invention will be explained below. FIG. 1 is a schematic diagram of a control system for the vending machine according to the first embodiment and FIG. 2 is a functional block diagram of the control system for the vending machine according to the first embodiment.

As shown in FIG. 1, this control system for vending machine is mainly composed of a main control apparatus 100, controlled apparatuses such as a coin identification apparatus 200, a display apparatus 300, a remote controller 400, a product carrying-out apparatus (not shown) and a bill identification apparatus (not shown), and a transmission path 500 that connects the main control apparatus 100 and the controlled apparatuses.

The coin identification apparatus 200 is equipped with a coin identification section 202 to identify the authenticity and type of coins deposited and a terminal control apparatus 201 to control the coin identification section 202. Likewise, the display apparatus 300 is equipped with a display section 302 such as a 7-segment LED and a terminal control apparatus 301 connected to the display section 302 to perform display control. Furthermore, the remote controller 400 is equipped with a display section 402 and operation section 403 and a terminal control apparatus 401 connected to these sections.

This control system controls the controlled apparatuses by carrying out communication between the main control apparatus 100 and the terminal control apparatuses 201, 301 and 401 of their respective controlled apparatuses via the transmission path 500. In the following descriptions, a case where only the coin identification apparatus 200 is used as a controlled apparatus will be explained.

As shown in FIG. 2, the main control apparatus 100 is equipped with a communication control section 101 to control communication with the terminal control apparatus 201 via the transmission path 500 and normal control section 102 to control the controlled apparatuses to perform predetermined operations in a normal operation such as sale of a product or sales management. The main control apparatus 100 also includes an input section 103 to input a new control program 601, etc. from a flash memory card 600, an example of a detachable storage medium, and a transfer control section 104 to transfer the new control program 601, etc. from the input section 103 to the terminal control apparatus 201, etc. Furthermore, the main control apparatus 100 includes a display section 105 to notify a rewrite of the control program to the administrator, etc. of the vending machine.

The communication control section 101 includes a communication device corresponding to the transmission path 500 as the main component.

More specifically, the communication control section 101 controls packet communication with the terminal control apparatus 201 via the transmission path 500. The communication control section 101 performs communication control about the transfer control section 104, which is different from communication control about the normal control section 102. More specifically, during communication about the transfer control section 104, the communication control section 101 performs control that will increase the data transfer speed compared to a normal operation. This control is performed in concert with a communication control section 211 of the terminal control apparatus 201, which will be described later. For example, the data transfer speed is increased by increasing the communication speed along the transmission path 500, suppressing communication with other terminal control apparatuses or switching to a communication protocol that allows dedicated high-speed transfer.

The normal control section 102 is means for controlling the controlled apparatuses to perform predetermined operations in a normal operation such as sale of a product or sales management by the administrator, etc. For example, the normal control section 102 acquires the money deposited from the coin identification apparatus 200 or instructs the display apparatus 300 to start a display. Specific contents of control for the controlled apparatuses are the same as those of conventional arts, and therefore their explanations will be omitted here.

The input section 103 is means for inputting the new control program 601, new data 602 used to execute the new control program 601 and a rewriting program 603 of the new control program 601 to the transfer control section 104. The specific configuration of this input section 103 is determined by a medium used to input the new control program 601, etc. For example, when a memory card 600 is used as a medium as shown in FIG. 2, its reading apparatus constitutes the main component. On the other hand, when a CD-ROM or flexible disk, etc. is used as the medium, a reading apparatus corresponding to the medium constitutes the main component. Moreover, when a communication line is used as a medium, a communication device corresponding to the communication line constitutes the main component. A modem, TA and router are examples of this communication device. The communication line as a medium can be wired or wireless.

The transfer control section 104 is means for transferring the new control program 601 input from the input section 103, new data 602 and rewriting program 603 to the terminal control apparatus 201, etc. More specifically, the transfer control section 104 transfers the rewriting program 603 to the terminal control apparatus 201, etc., a controlled apparatus, which is a target of the new control program 601, via the transmission path 500 and transfers the new control program 601 and the new data 602 in concert with the rewriting program 603 executed by the terminal control apparatus 201.

The terminal control apparatus 201 is equipped with the communication control section 211 to control communication with the main control apparatus 100 via the transmission path 500, the normal control section 212 to control the coin identification section 202 to perform a predetermined operation in a normal operation such as sale of a product and sales management and an input/output control section 215 connected to the coin identification section 202. The terminal control apparatus 201 further includes a rewriting program reception/execution section 216 to receive the rewriting program 603 from the main control apparatus 100 and execute this rewriting program 603. When the rewriting program reception/execution section 216 executes the rewriting program 603, the control program 213 and various data 214 of the normal control section 212 are rewritten to the new control program 601 and new data 602.

As in the case of the communication control section 101 of the main control apparatus 100, the communication control section 211 has a communication device compatible with the transmission path 500 as the main component. More specifically, the communication control section 211 controls packet communication with the communication control section 101 of the main control apparatus 100 via the transmission path 500. Furthermore, during a transfer of the new control program 601, etc., the communication control section 211 performs communication control different from control during normal communication in concert with the communication control section 101 of the main control apparatus 100. More specifically, during a transfer of the new control program 601, etc., the communication control section 211 controls so that the data transfer speed is increased compared to that during a normal operation. For example, the communication control section 211 increases the data transfer speed by increasing the communication speed of the transmission path 500 and suppressing communication between other terminal control apparatuses and the main control apparatus or switching to a communication protocol that allows a dedicated high-speed transfer.

The normal control section 212 controls the coin identification section 202 connected via the input/output control section 215 while mutually communicating with the main control apparatus 100. The contents of control of the normal control section 212 are the same as those of conventional arts, and therefore explanations thereof will be omitted. This normal control section 212 operates based on the control program 213. When the control program 213 is executed, various data 214 such as product unit price information is accessed. The control program 213 is stored in an electrically rewritable storage apparatus.

The transmission path 500 is a communication medium to perform mutual communication between the communication control section 101 of the main control apparatus 100 and the communication control section 211 of the terminal control apparatus 201. As the transmission path 500, a wired medium such as a metallic cable and optical fiber or a wireless medium is used. In this embodiment, a metallic cable is used.

Figure 3:
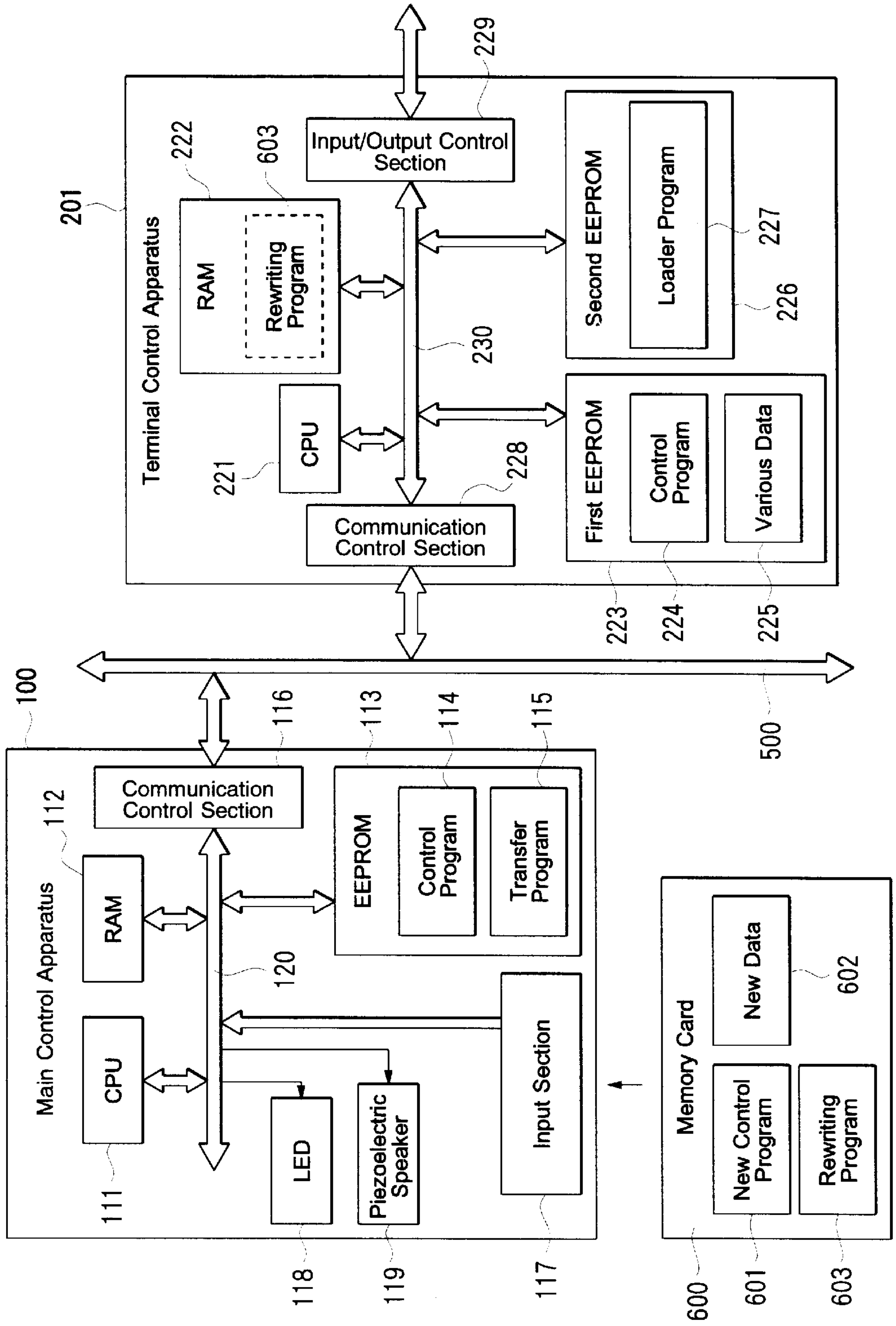
FIG. 3 is an outlined circuit diagram of the control system for the vending machine according to the first embodiment.

An example of a specific circuit configuration of the control system for the vending machine above will be explained with reference to FIG. 3. FIG. 3 is an outlined circuit diagram of the control system for the vending machine according to the first embodiment.

As shown in FIG. 3, the main control apparatus 100 is equipped with a CPU 111, a RAM 112, an EEPROM 113, a communication control section 116, an input section 117, an LED 118, a piezoelectric speaker 119 and a bus 120 that connects these sections. The RAM 112 is a volatile memory such as an SRAM and DRAM and is mainly a storage apparatus for various operations. The EEPROM 113 is an electrically rewritable non-volatile memory and stores a normal control program 114 and transfer program 115. The communication control section 116 is an interface section with the transmission path 500. The input section 117 is an interface section with the memory card 600, which is a storage medium such as the new control program 601. The LED 118 and piezoelectric speaker 119 notify or display various information to the administrator, etc. by means of light or sound.

The terminal control apparatus 201 is equipped with a CPU 221, RAM 222, a first EEPROM 223, a second EEPROM 226, a communication control section 228, an input/output control section 229 and a bus 230 that connects these sections. The RAM 222 is a volatile memory such as an SRAM and DRAM and is mainly a storage apparatus for various operations. The first EEPROM 223 and the second EEPROM 226 are electrically rewritable non-volatile memories. The first EEPROM stores a normal control program 224 and various data 225 used for operation of the program. The second EEPROM 226 stores a rewriting program reception/execution program (hereinafter referred to as "loader program") 227. The communication control section 228 is an interface section with the transmission path 500. The input/output control section 229 is an interface section with the coin identification section 202.

Figure 4:
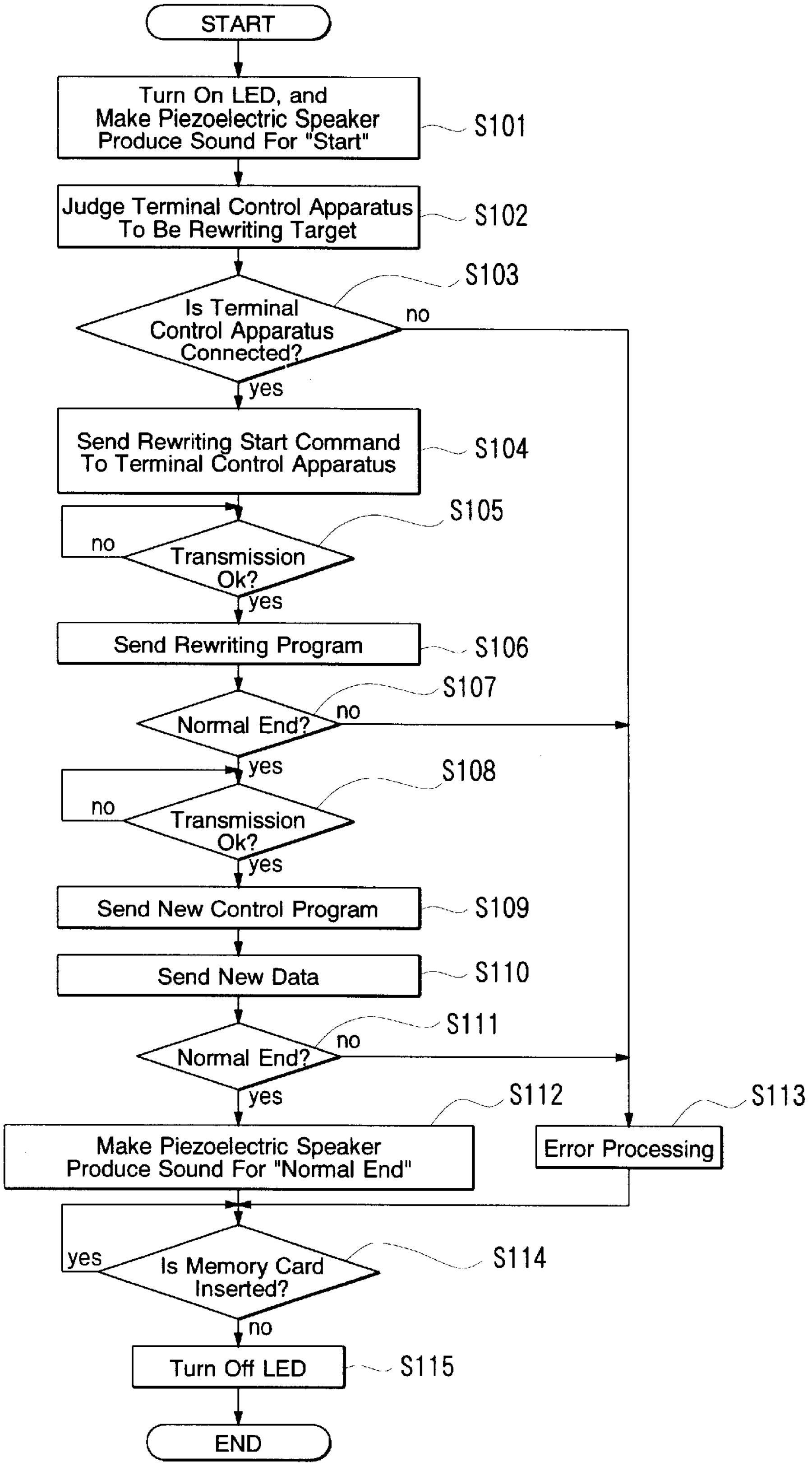
FIG. 4 is a flow chart of a transfer program according to the first embodiment.

Then, the operation of the main control apparatus 100 will be explained. The main control apparatus 100 operates based on the normal control program 114 and transfer program 115 stored in the EEPROM 113. The operation based on the normal control program 114 is the same as that of the conventional art and therefore explanations thereof will be omitted here. The operation based on the transfer program 115 will be explained with reference to FIG. 4 below. FIG. 4 is a flow chart of the transfer program according to the first embodiment.

This transfer program 115 starts to operate when the memory card 600 is inserted into the input section 117 during the operation based on the normal control program 114.

First, the program makes the LED 118 light up and makes the piezoelectric speaker 119 output sound to indicate the start of processing (step S101). Here, the piezoelectric speaker 119 produces one short beeping sound. This notifies the administrator of the vending machine that the rewriting operation starts.

Then, the program reads the data of the terminal control apparatus, the operation target, from the new control program 601 stored in the memory card 600 and judges whether the terminal control apparatus is connected to the main control apparatus 100 via the transmission path 500 based on this (step S102). In the case where the terminal control apparatus is not connected to the main control apparatus 100, the program shifts the processing to step S113 to carry out error processing (step S103).

Then, the program sends a rewriting start command to the terminal control apparatus 201, a rewriting target, via the transmission path 500 (step S104). After this, the program waits for a reply from the terminal control apparatus 201 (step S105). When the reply content from the terminal control apparatus 201 is "Transmission OK", the program sends the rewriting program 603 stored in the memory card 600 to the terminal control apparatus 201 (step S106). After this transmission, when the transmission result sent back from the terminal control apparatus 201 is "Abnormal end", the program shifts the processing to step S113 to carry out error processing (step S107).

When the reply content sent back from the terminal control apparatus 201 is "Normal end", the program further waits until the terminal control apparatus 201 sends "Transmission OK" that allows the transmission of the new control program 601 (step S108). Upon reception of this "Transmission OK", the program sends the new control program 601 to the terminal control apparatus 201 and then sends the new data 602 to the terminal control apparatus 201 (steps S109, S110). Then, if the reply from the terminal control apparatus 201 is "Abnormal end", the program shifts the processing to step S113 to carry out error processing (step S111).

When the reply content from the terminal control apparatus 201 is "Normal end", the program makes the piezoelectric speaker 119 produce sound to notify that the rewriting processing has ended normally (step S112). Here, the piezoelectric speaker 119 produces one long beep sound.

In step S113 shifted from the above-described steps S103, S107 and S111, the program makes the piezoelectric speaker 119 produce sound to notify that the rewriting processing has not ended normally (step S113). Here, the piezoelectric speaker 119 produces a few long beep sounds.

Finally, the program confirms that the memory card 600 has been removed (step S114), turns off the LED 118 and ends the processing (step S115). After the processing based on this transfer program 115 has ended, it is possible to return to the processing based on the normal control program 114.

Figure 5:
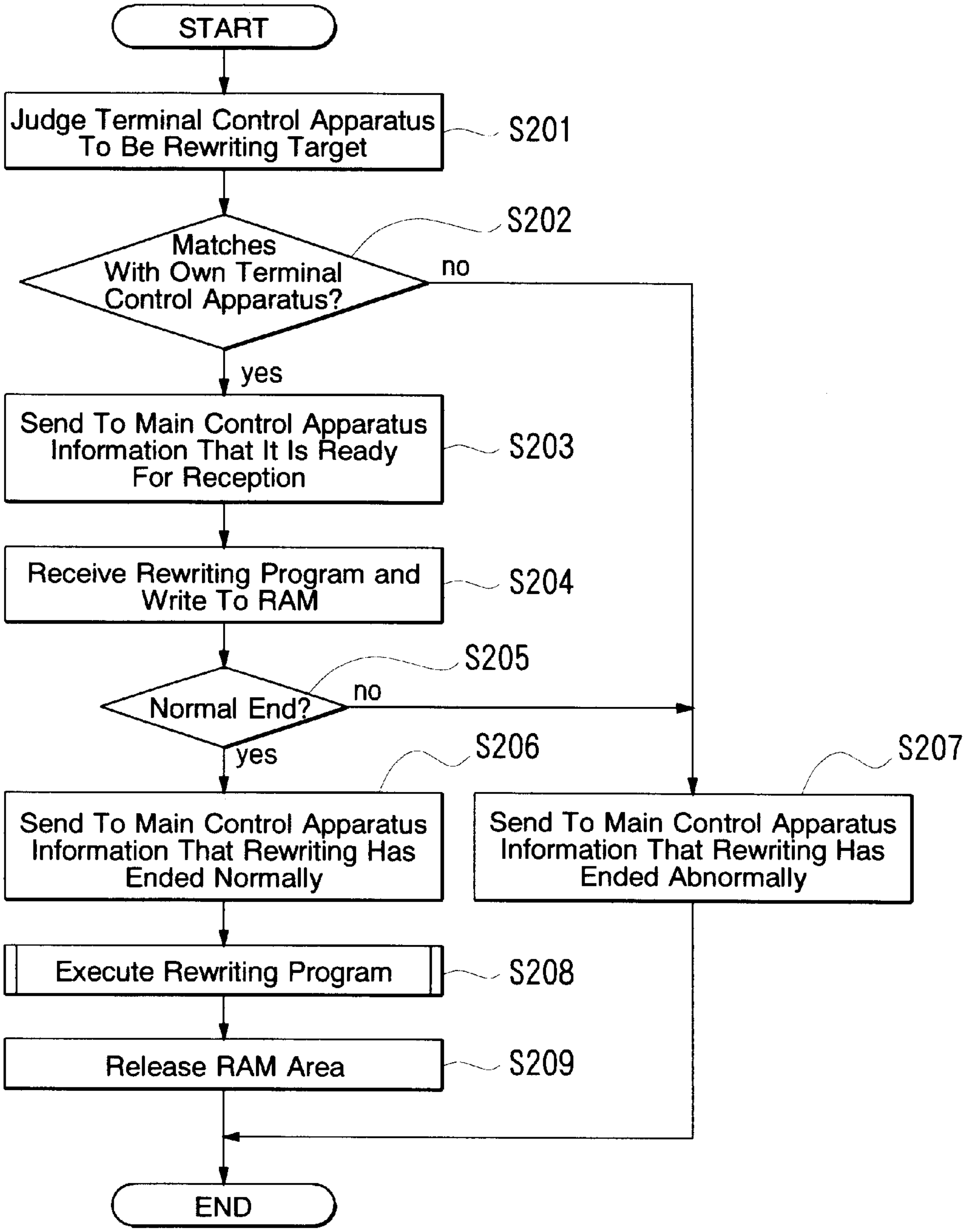
FIG. 5 is a flow chart of a loader program according to the first embodiment.

Then, the operation of the terminal control apparatus 201 will be explained. The terminal control apparatus 201 operates based on the normal control program 224 stored in the first EEPROM 223 and the loader program 227 stored in the second EEPROM 226. Here, the operation based on the normal control program 224 is the same as that of the conventional art, and therefore explanations thereof will be omitted here. The operation based on the loader program 227 will be explained below with reference to FIG. 5. FIG. 5 is a flow chart of the loader program according to the first embodiment.

This loader program 227 starts to operate when a rewriting start command (see step S104 in FIG. 4) is received from the main control apparatus 100 during an operation based on the normal control program 224.

First, it is judged whether the rewriting start command is directed to the own terminal control apparatus or not (step S201). When the received rewriting start command is of a type different from the type of the own terminal control apparatus, the loader program shifts the processing to step S207 to carry out error processing (step S202).

Then, the program sends to the main control apparatus 100 the information that it is ready to receive the rewriting program 603 (step S203). Then, in response to the transmission of the information, the program receives the rewriting program 603 sent from the main control apparatus 100 and writes this to the RAM 222 (step S204). When the reception and writing have not ended normally, the program shifts the processing to step S207 to carry out error processing (step S205).

When the reception of the rewriting program 603 and writing to the RAM 222 have ended normally, the program notifies the main control apparatus 100 that the rewriting has ended normally via the transmission path 500 (step S206). Then, the program executes the rewriting program 603 written in the RAM 222 (step S208). When the execution of the rewriting program 603 is completed, the program releases the storage area in the RAM 222 that has stored the rewriting program 603 (step S209).

Figure 6:
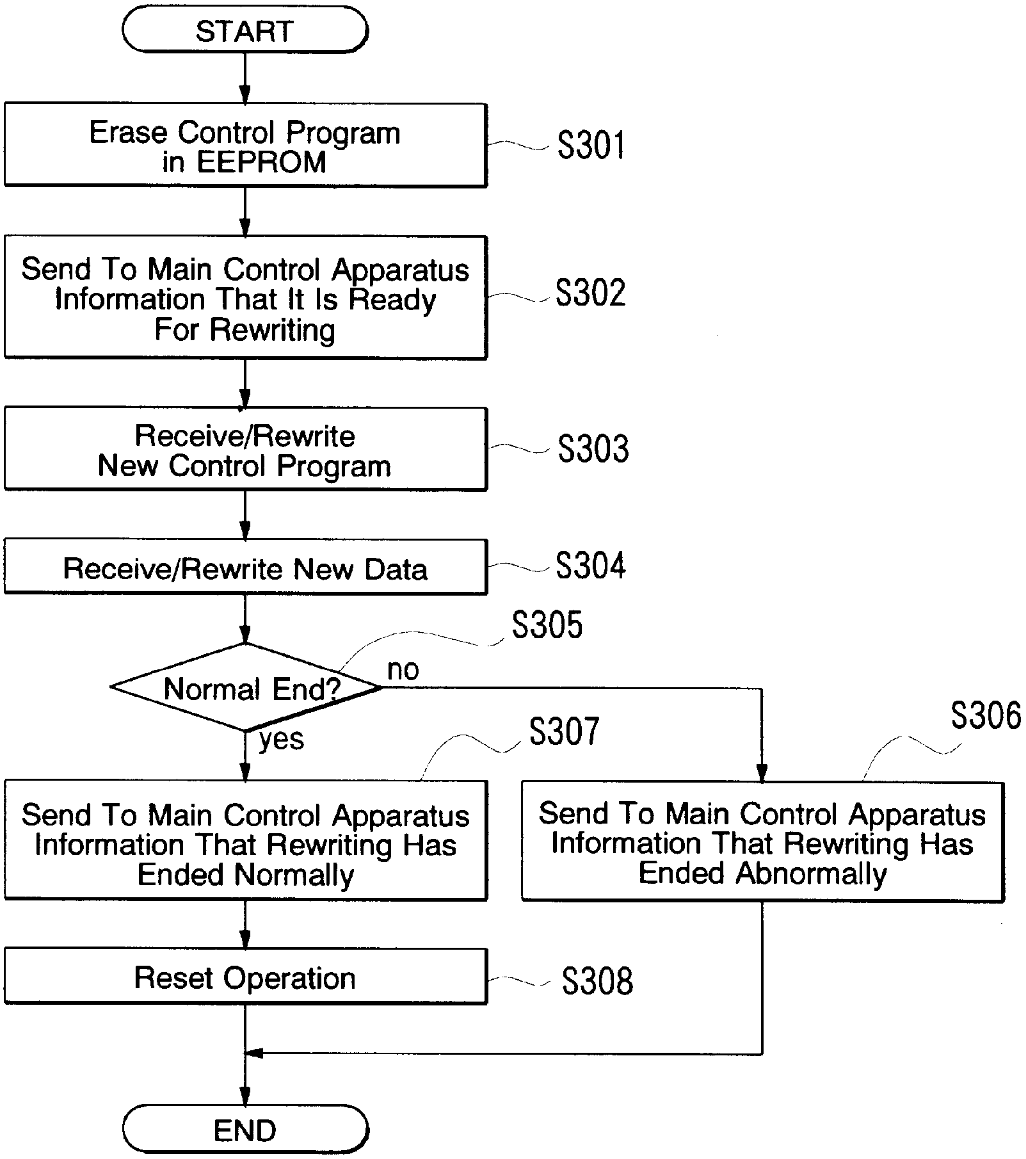
FIG. 6 is a flow chart of a rewriting program according to the first embodiment.

Then, the operation of the rewriting program 603 in the aforementioned step S208 will be explained with reference to the flow chart in FIG. 6. FIG. 6 is a flow chart of the rewriting program according to the first embodiment.

The rewriting program 603 erases the control program 224 and various data 225 stored in the first EEPROM 223 first (step S301). Then, the program sends to the main control apparatus 100 the information that it is ready to rewrite (step S302). Then, in response to the transmission of the information, the program receives the new control program 601 sent from the main control apparatus 100 and writes this to the first EEPROM 223 (step S303). Then, the program receives the new data 602 sent from the main control apparatus 100 following the new control program 601 and writes this to the first EEPROM 223 (step S304). Then, the program judges whether the processing of this reception and writing have ended normally or not (step S305) and if there is any error, the program sends to the main control apparatus 100 the information that an error has occurred (step S306). When the processing has ended normally, the program sends to the main control apparatus 100 the information that the processing has ended normally (step S307) and the program resets itself and thereby ends the operation based on the rewriting program 603 and the operation based on the new control program 601 written in the first EEPROM 223 starts to operate (step S308).

According to the control system for the vending machine according to this embodiment, when the memory card 600 is inserted into the main control apparatus 100, the rewriting program 603 stored in the memory card 600 is transferred to the terminal control apparatus 201 via the transmission path 500 and written to the RAM 222 of the terminal control apparatus 201. Then, through the execution of the rewriting program 603, the control program 224 of the terminal control apparatus 201 is rewritten with the new control program 601 stored in the memory card 600. Thus, this embodiment makes it possible to easily and reliably update the control program without being influenced by the installation location of the terminal control apparatus 201.

Furthermore, in the control system according to this embodiment, the main control apparatus 100 transfers the rewriting program 603 that rewrites the control program to the terminal control apparatus 201 and the terminal control apparatus 201 executes this rewriting program 603, making it possible to reliably perform appropriate rewriting according to changes to the specification, etc. of the control program. Furthermore, in this embodiment, the storage area that stores the program is released after the execution of the rewriting program 603, and therefore it is possible to effectively use memory space of the terminal control apparatus 201.

Furthermore, the control system according to this embodiment sends not only the new control program 601 but also the new data 602 necessary to execute the program and rewrites the various data 225 used by the terminal control apparatus 201 with the new data 602, making it possible to reliably perform the operation by the new control program 601 after rewriting.

Furthermore, in this embodiment, the terminal control apparatus 201 stores the normal control program 224 and loader program 227 in different EEPROMS, but it is also possible to store those programs in the same EEPROM. Furthermore, the normal control program 224 and various data 225 are stored in the same EEPROM, but it is also possible to store the various data 225 in another EEPROM or RAM, etc.

[Second Embodiment]

Figure 7:
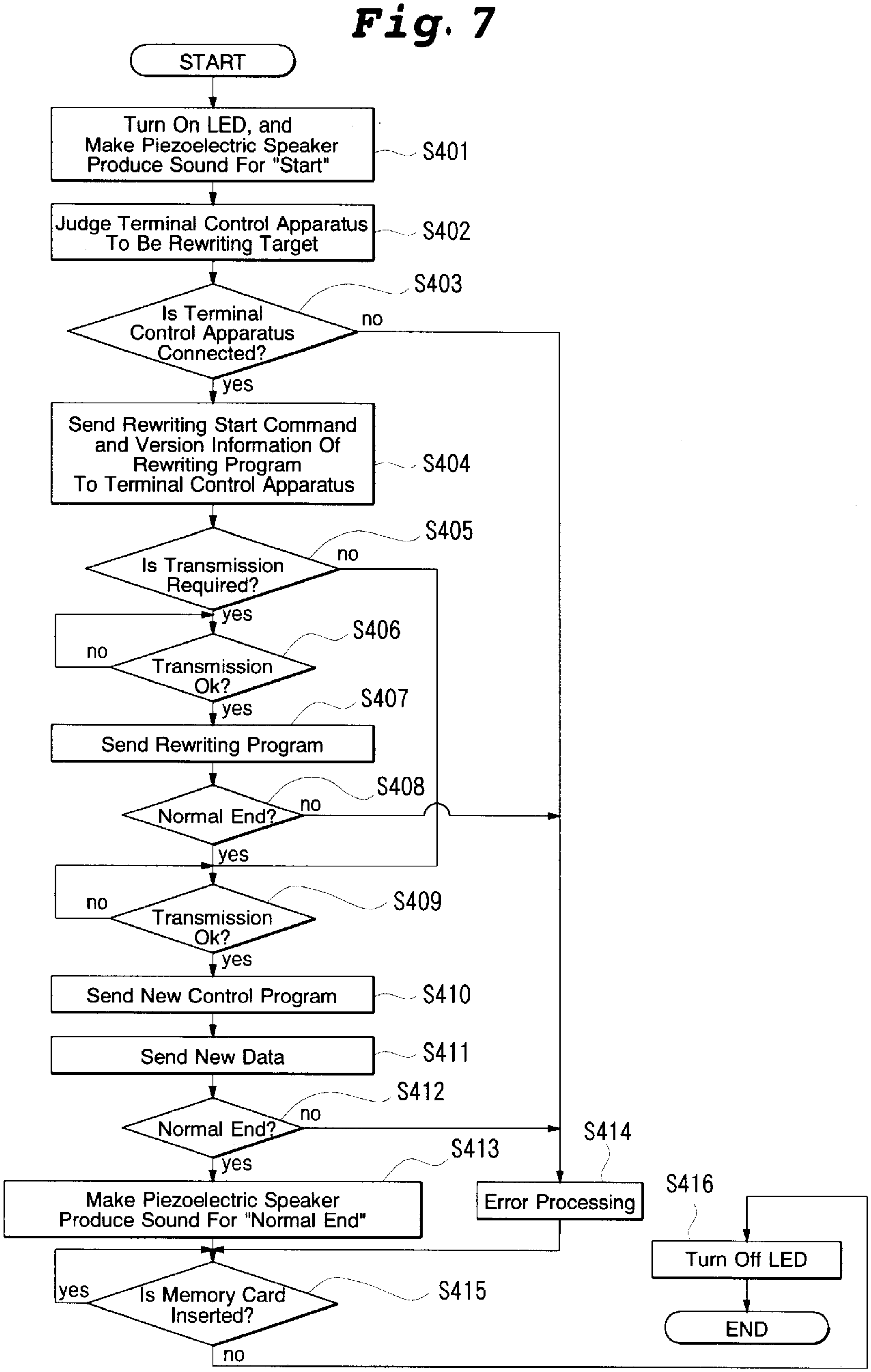
FIG. 7 is a flow chart of a transfer program according to a second embodiment.
Figure 8:
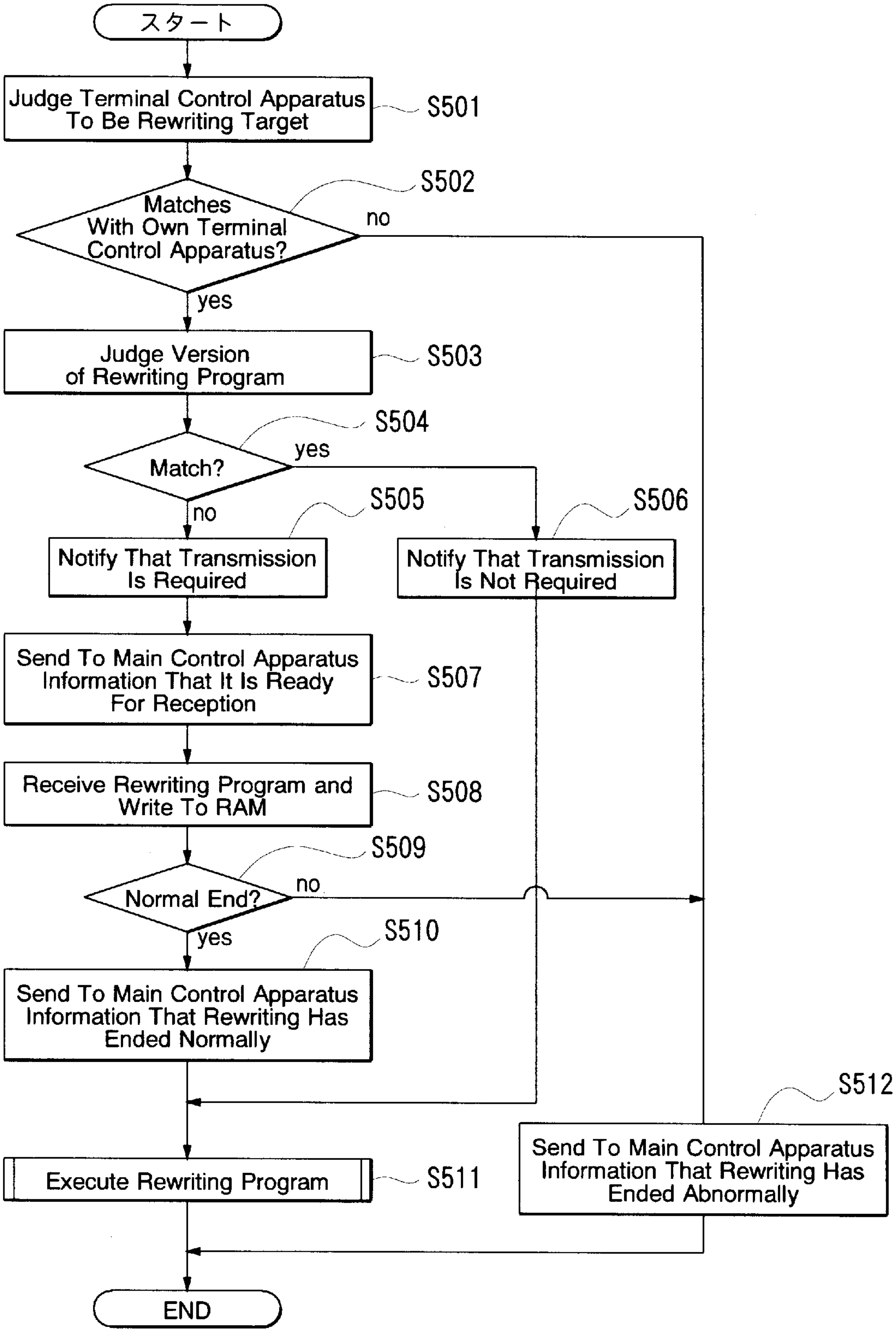
FIG. 8 is a flow chart of a loader program according to the second embodiment.

A control system for a vending machine according to a second embodiment of the present invention will be explained with reference to FIG. 7 and FIG. 8. FIG. 7 is a flow chart of a transfer program according to the second embodiment and FIG. 8 is a flow chart of a loader program according to the second embodiment.

The control system according to this embodiment differs from the first embodiment in that while in the first embodiment, the terminal control apparatus 201 releases the storage area that stores the rewriting program 603 after the rewriting program 603 is executed, in this embodiment the storage area continues to store the rewriting program even after the program is executed and the rewriting program stored in the terminal control apparatus 201 is executed if the type of the rewriting program remains the same in the next rewriting. The other parts of the configuration are the same as those in the first embodiment, and therefore explanations thereof will be omitted and only the operation of the transfer program 115*a* in the main control apparatus 100 and loader program 227*a* in the terminal control apparatus 201 will be explained.

As shown in FIG. 7, the transfer program 115*a* in the main control apparatus 100 starts to operate when the memory card 600 is inserted into the input section 117 during an operation based on the normal control program 114.

First, the program makes the LED 118 light up and makes the piezoelectric speaker 119 output sound to indicate the start of processing (step S401). Here, the piezoelectric speaker 119 produces one short beeping sound. This notifies the administrator of the vending machine that the rewriting operation starts.

Then, the program reads the data of the terminal control apparatus, which is the operation target, from the new control program 601 stored in the memory card 600 and based on this, the program judges whether the terminal control apparatus is connected to the main control apparatus 100 via the transmission path 500 (step S402). In the case where the terminal control apparatus is not connected to the main control apparatus 100, the program shifts the processing to step S414 to carry out error processing (step S403).

Then, the program sends a rewriting start command and the version information of the rewriting program 603 to the terminal control apparatus 201, a rewriting target, via the transmission path 500 (step S404). After this, the program waits for a reply about whether the transmission of the rewriting program 603 is required from the terminal control apparatus 201 or not (step S405). When the reply content from the terminal control apparatus 201 is "Transmission required", the program shifts the processing to step S406 and starts preparation for the transmission of the rewriting program 603. On the other hand, when the reply content from the terminal control apparatus 201 is "Transmission not required", the program shifts the processing to step S409 and omits the transmission of the rewriting program 603 and starts preparation for the transmission of the new control program 601, etc.

In step S406, the program waits for a reply "Transmission OK" from the terminal control apparatus 201, and when the reply content from the terminal control apparatus 201 is "Transmission OK", the program sends the rewriting program 603 stored in the memory card 600 to the terminal control apparatus 201 (steps S406, S407). After this transmission, when the transmission result sent back from the terminal control apparatus 201 is "Abnormal end", the program shifts the processing to step S414 to carry out error processing (step S408). When the reply content from the terminal control apparatus 201 is "Normal end", the program shifts the processing to step S409 (step S408).

In step S409, the program waits until the terminal control apparatus 201 sends "Transmission OK" that allows the transmission of the new control program 601 (step S409). Upon reception of "Transmission OK", the program sends the new control program 601 to the terminal control apparatus 201 and then sends the new data 602 to the terminal control apparatus 201 (steps S410, S411). Then, when the reply from the terminal control apparatus 201 is "Abnormal end", the program shifts the processing to step S414 to carry out error processing (step S412).

When the reply contents from the terminal control apparatus 201 are "Normal end", the program makes the piezoelectric speaker 119 produce sound to notify that the rewriting processing has ended normally (step S413). Here, the piezoelectric speaker 119 produces one long beep sound.

In step S414 shifted from above-described steps S403, S408 and S412, the program makes the piezoelectric speaker 119 produce sound to notify that the rewriting processing has not ended normally (step S414). Here, the piezoelectric speaker 119 produces a few long beep sounds.

Finally, the program confirms whether the memory card 600 has been removed or not (step S415), makes the LED 118 go off and ends the processing (step S416). After the processing based on this transfer program 115*a* ends, it is possible to return to the processing based on the normal control program 114.

On the other hand, as shown in FIG. 8, the loader program 227*a* starts to operate by receiving a rewriting command (see step S404 in FIG. 7) from the main control apparatus 100 during an operation based on the normal control program 224.

First, the program judges whether the rewriting start command is directed to the own terminal control apparatus or not (step S501). When the received rewriting start command is of a type different from the type of the own terminal control apparatus, the program shifts the processing to step S512 to carry out error processing (step S502).

Then, the program compares the version information of the rewriting program received together with the above-described rewriting command with the version information of the previous rewriting program stored in the RAM 222 and judges whether both are the same or not (step S503). When the judgment result shows that both are the same, the program sends the information that transmission is not required to the main control apparatus 100 (steps S504, S506), shifts the processing to step S511 to execute the previously used rewriting program without receiving the rewriting program 603. On the other hand, the judgment result above shows that both do not match, the program sends the information that transmission is required to the main control apparatus 100 (step S504, S505) and the program shifts the processing to step S507 to receive the rewriting program 603 from the main control apparatus 100.

In step S507, the program sends the information that it is ready to receive the rewriting program 603 to the main control apparatus 100 (step S507). Then, the program receives the rewriting program 603 sent by the main control apparatus 100 in response to the transmission of the information and writes the rewriting program 603 in the RAM 222 (step S508). When the reception and writing have not ended normally, the program shifts the processing to step S512 to carry out error processing (step S509).

When the reception of the rewriting program 603 and writing to RAM 222 have ended normally, the program notifies the main control apparatus 100 that the writing has ended normally via the transmission path 500 (step S510).

In step S511, the program executes the rewriting program 603 written in the RAM 222 (step S511). When the execution of the rewriting program 603 is completed, the program ends the processing without releasing the storage area in the RAM 222 that has stored the rewriting program 603 unlike the first embodiment.

Thus, the control system according to this embodiment, it is judged whether the transmission of the rewriting program 603 is required or not prior to the transfer of the new control program 601 and the rewriting program 603 is transferred only when the transmission is required, and therefore the total time required for rewriting can be shortened. Other actions and effects are the same as those in the first embodiment.

[Third Embodiment]

Figure 9:
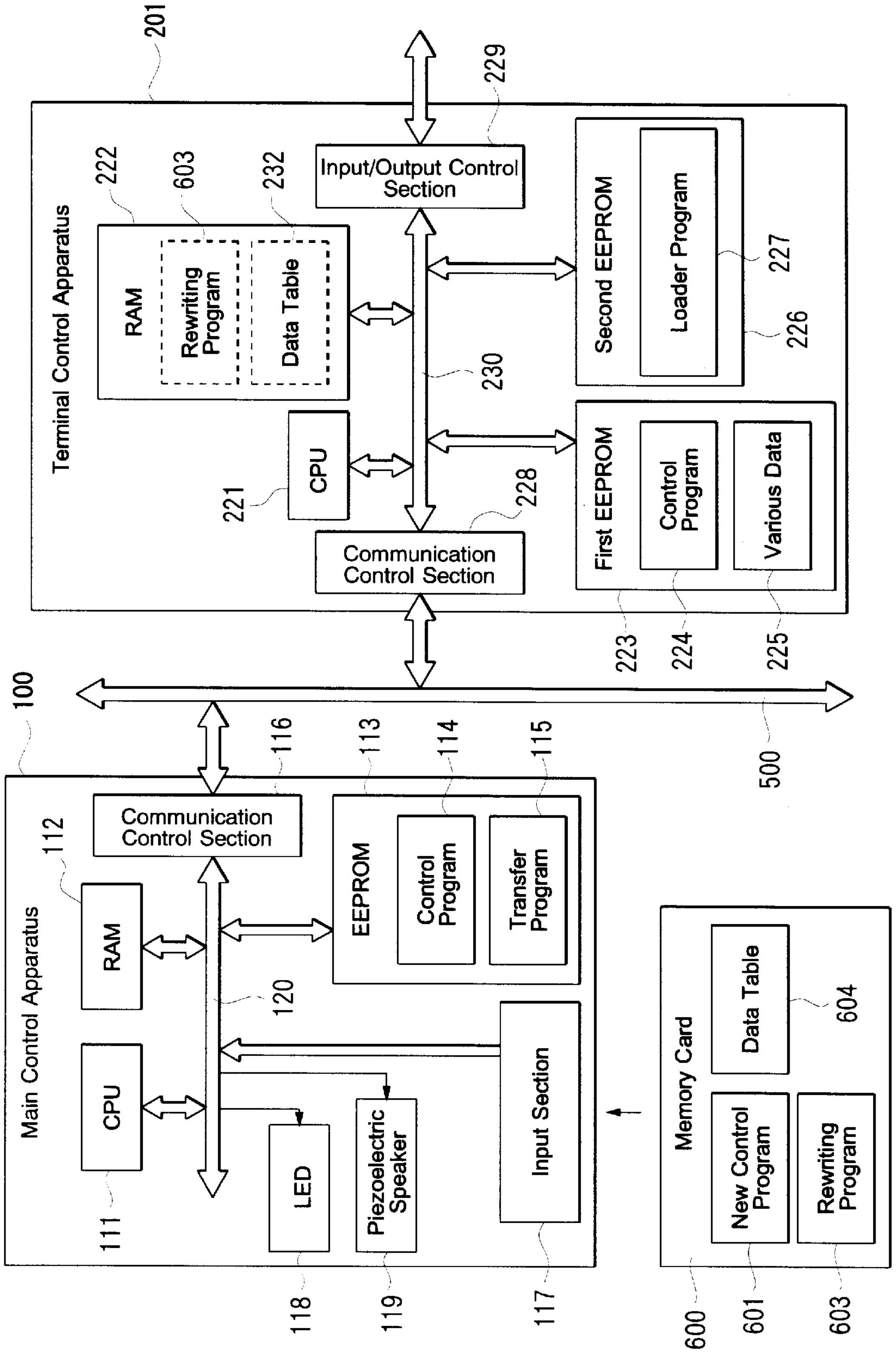
FIG. 9 is an outlined circuit diagram of a control system for a vending machine according to a third embodiment.
Figure 10:
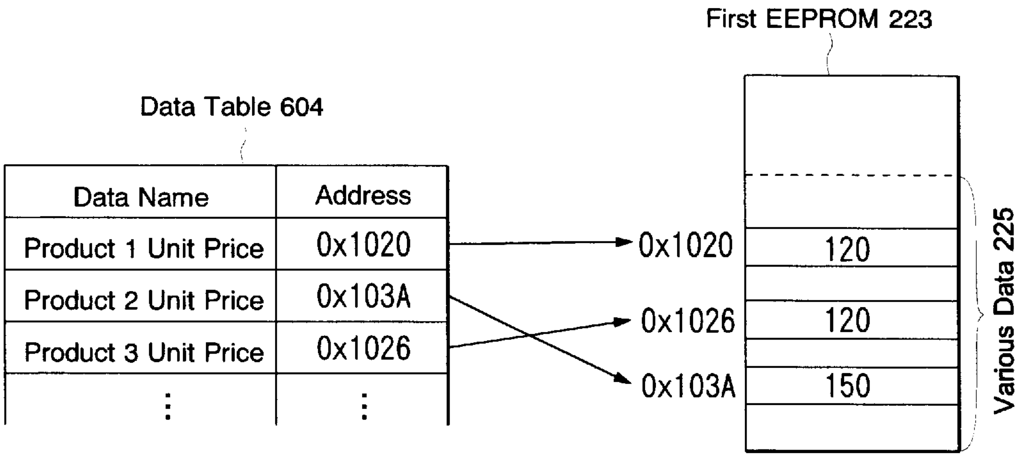
FIG. 10 is a drawing to explain a data table according to the third embodiment.

A control system according to a third embodiment of the present invention will be explained with reference to FIG. 9 and FIG. 10. FIG. 9 is an outlined circuit diagram of the control system for a vending machine according to the third embodiment and FIG. 10 is a drawing to explain a data table.

The control system according to this embodiment differs from the first embodiment in that while in the first embodiment, the new data 602 required by the new control program 601 is sent to the terminal control apparatus 201 together with the new control program 601, in this embodiment the new data 602 is not sent, but a data table 604 is sent instead. This difference will be explained in detail below. The parts of the same configuration in this figure as those in the first embodiment are assigned the same reference numerals.

As shown in FIG. 9, the memory card 600 is provided with a new control program 601, a data table 604 used for the new control program 601 to access various data 225 of the terminal control apparatus 201 and a rewriting program 603.

In this control system, the data table 604 together with the new control program 601 is transferred from the main control apparatus 100 to the terminal control apparatus 201 and the data table 604 is stored in the RAM 222. At this time, unlike the first embodiment, the various data 225 stored in the first EEPROM 223 is not erased.

The new control program 601 is stored in the first EEPROM 223 and uses the data table 604 stored in the RAM 222 to access the various data 225 accessed by the control program 224 before rewriting. This data table 604 stores an address in the various data 225, which stores data corresponding to a data name such as "Unit price of product 1" as shown in FIG. 10. That is, the data table 604 is pointer information indicating the address in the various data 225 corresponding to the data name. To access the value of "Unit price of product 1", for example, the new control program 601 can acquire address "0x1020" from the data table 604 and acquire value "120" from address "0x1020" of the first EEPROM that stores the various data 225.

Thus, the control system according to this embodiment can access the various data 225 used by the previous control program from the new control program 601, and can thereby reliably take over the previous environment. Other actions and effects are the same as those in the first embodiment.

In this embodiment, the various data 225, the target of the data table 604, is stored in the first EEPROM 223, but the various data 225 can also be stored in another storage apparatus such as the RAM 222 in addition to the first EEPROM 223. This allows the various data changed by the operation of the terminal control apparatus 201 to be accessed from the new control program 601.

[Fourth Embodiment]

Figure 11:
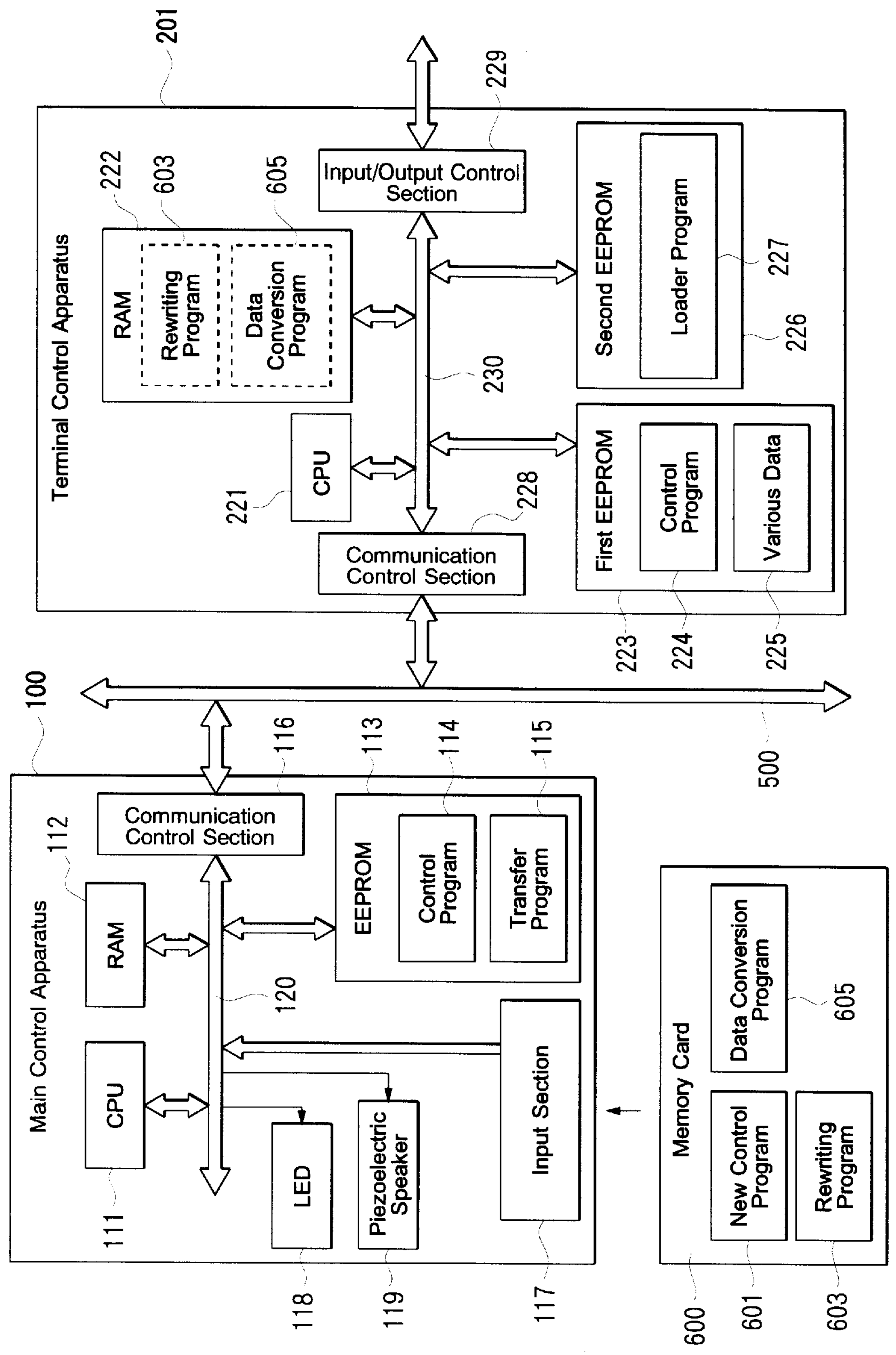
FIG. 11 is an outlined circuit diagram of a control system for a vending machine according to a fourth embodiment.
Figure 12:
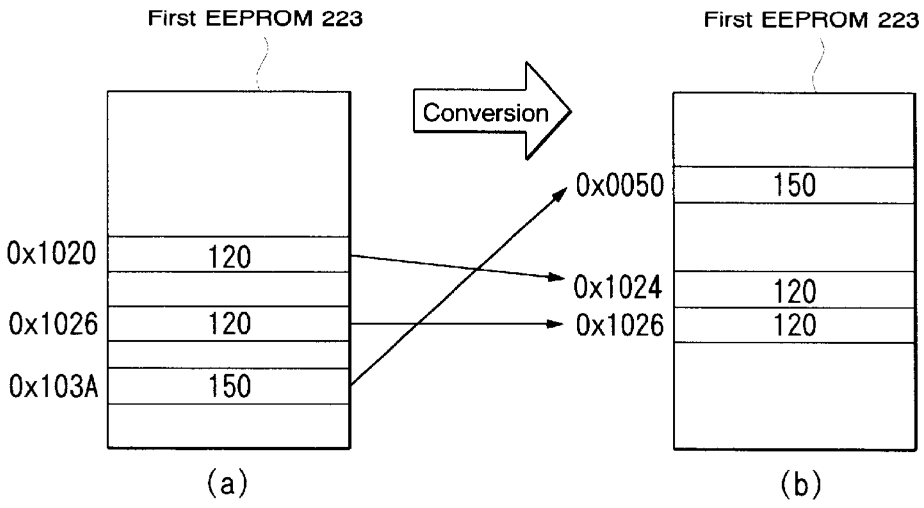
FIG. 12 is a drawing to explain data conversion according to the fourth embodiment.

A control system according to a fourth embodiment of the present invention will be explained with reference to FIG. 11 and FIG. 12. FIG. 11 is an outlined circuit diagram of the vending machine control system according to the fourth embodiment and FIG. 12 is a drawing to explain data conversion.

The control system according to this embodiment differs from the first embodiment in that while in the first embodiment, the new data 602 required by the new control program 601 is sent to the terminal control apparatus 201 together with the new control program 601, in this embodiment, the new data 602 is not sent, but a data conversion program 605 that converts the various data 225 of the terminal control apparatus 201 is sent instead. This difference will be explained in detail below. The parts of the same configuration in this drawing as those in the first embodiment are assigned the same reference numerals.

As shown in FIG. 11, the memory card 600 is provided with a new control program 601, a data conversion program 605 to convert the various data 225 before rewriting to allow the various data 225 to be accessed from the new control program 601 and a rewriting program 603.

In this control system, the data conversion program 605 together with the new control program 601 is transferred from the main control apparatus 100 to the terminal control apparatus 201 and the data conversion program 605 is stored in the RAM 222. Then, the data conversion program 605 is executed before the loader program 227 or rewriting program 603 starts to be processed by the new control program 601.

As shown in FIG. 12, the data conversion table 605 changes the arrangement of the various data 225 (see FIG. 12(*a*)) stored in the first EEPROM 223 to an arrangement (see FIG. 12(*b*)) accessible from the new control program 601.

Thus, the control system according to this embodiment converts the data so that the new control program 601 can access the various data 225 used by the previous control program, and can thereby reliably take over the previous environment. Other actions and effects are the same as those in the first embodiment.

In this embodiment, the various data 225, the target of the data table 604, is stored in the first EEPROM 223, but the various data 225 can also be stored in another storage apparatus such as the RAM 222 in addition to the first EEPROM 223. This allows the various data changed by the operation of the terminal control apparatus 201 to be accessed from the new control program 601.

The present embodiments are to be considered in all respects as illustrative and not restrictive, the scope of the invention being indicated by the appended claims rather than by the foregoing description and all changes which come within the meaning and range of equivalency of the claims are therefore intended to be embraced therein.

Figure 13:
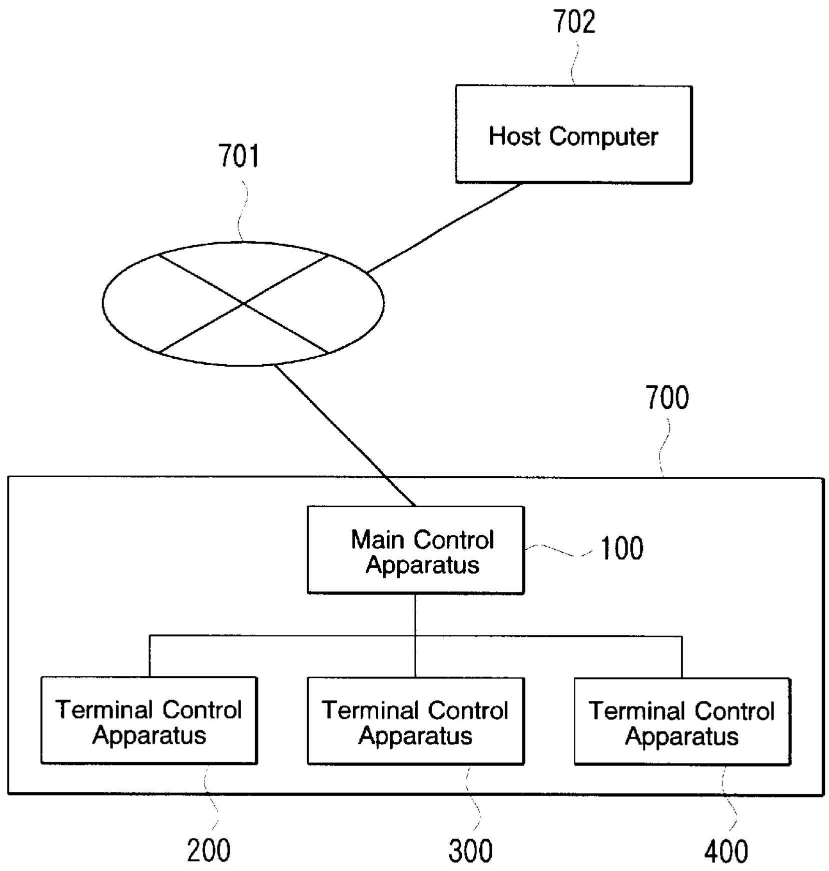
FIG. 13 is a schematic drawing of a control system according to another embodiment of the present invention.

For example, the above embodiments use a storage medium such as the memory card 600 to input a new control program, etc. to the main control apparatus 100, but it is also possible to use a different storage medium. For example, it is also possible to use a flexible disk, CD-ROM or magnetic card, etc. It is further possible, as shown in FIG. 13, to input the new control program, etc. from a host computer 702 via a communication line 701 without using any storage medium. In this case, the administrator of the vending machine 700 need not go to the place where the machine is installed, and therefore it is easy to rewrite the program. This is particularly effective when a plurality of vending machines 700 needs to be rewritten all together as in the case of a wholesale change of the unit price of a product. Moreover, the communication line 701 can be either wired or wireless and any type of protocol can be used. For example, a PHS (Personal Handy-phone System) network can be used.

We claim:

1. A control system for vending machine, comprising:

a terminal control apparatus that controls controlled apparatuses of the vending machine; and a main control apparatus that is connected to the terminal control apparatus via a transmission path and controls the terminal control apparatus through communication with the terminal control apparatus, wherein the main control apparatus includes transferring means for transferring a control program of the terminal control apparatus and a rewriting program that rewrites the control program to the terminal control apparatus via the transmission path, the terminal control apparatus includes first storing means for storing the control program of the controlled apparatuses, second storing means for storing said rewriting program and rewriting program receiving/executing means for storing said rewriting program received from the main control apparatus into the second storing means and executing said rewriting program, and the rewriting program executed by said rewriting program receiving/executing means receives the control program from the main control apparatus and rewrites the control program stored in said first storing means with the control program received from the main control apparatus.

2. The system according to claim 1, wherein said rewriting program receiving/executing means releases the storage area of the rewriting program in the second storing means after the operation by the rewriting program is completed.

3. The system according to claim 1, wherein said rewriting program receiving/executing means compares the rewriting program to be sent from the main control apparatus with the rewriting program stored in the second storing means prior to reception of the rewriting program from the main control apparatus and when both programs are identical, executes the rewriting program stored in the second storing means without receiving any rewriting program.

4. The system according to claim 1, wherein said main control apparatus includes inputting means for inputting said control program from a detachable storage medium that stores the control program to said transferring means.

5. The system according to claim 1, wherein said main control apparatus includes inputting means for inputting the control program received from a remote place via a communication line to said transferring means.

6. The system according to claim 1, wherein said terminal control apparatus further includes third storing means for storing data necessary to execute the control program, said transferring means of the main control apparatus transfers data necessary to execute. said control program together with the control program to the terminal control apparatus, and said terminal control apparatus rewrites the data stored in the third storing means with the data received from the main control apparatus by executing said rewriting program.

7. The system according to claim 1, wherein said terminal control apparatus further includes third storing means for storing data necessary to execute the control program, said transferring means of the main control apparatus transfers a conversion program to convert said data so that said control program can access data stored in said third storing means together with the control program to the terminal control apparatus, and said terminal control apparatus converts the data stored in the third storing means by executing said conversion program received from the main control apparatus.

8. The system according to claim 1, wherein said terminal control apparatus further includes third storing means for storing data necessary to execute the control program, said transferring means of the main control apparatus transfers information of access to said data so that said control program can access data stored in said third storing means together with the control program to the terminal control apparatus, and said terminal control apparatus accesses the data stored in the third storing means based on said access information when the control program received from the main control apparatus is executed.

* * * * *